United States Patent [19]

Stacher et al.

[11] Patent Number: 5,401,583
[45] Date of Patent: Mar. 28, 1995

[54] IMPROVED GAS MANIFOLDING FOR SUPER PLASTIC FORMING AND DIFFUSION BONDING OF TRUSS CORE SANDWICHES

[75] Inventors: George W. Stacher, Westminster; Seb R. Sarkisian, Torrance, both of Calif.

[73] Assignee: Rockwell International Corporation, Seal Beach, Calif.

[21] Appl. No.: 912,082

[22] Filed: Jul. 9, 1992

Related U.S. Application Data

[63] Continuation of Ser. No. 739,582, Aug. 2, 1991, abandoned.

[51] Int. Cl.⁶ ............................................. B23K 20/18
[52] U.S. Cl. ....................... 428/594; 428/586; 428/593; 228/118; 228/157
[58] Field of Search ............... 428/586, 594, 593; 228/118, 157; 420/902

[56] References Cited

U.S. PATENT DOCUMENTS

| | | | |
|---|---|---|---|
| 3,297,082 | 1/1967 | Tranel et al. | 165/170 |
| 3,933,442 | 1/1976 | Carroll et al. | 29/191 |
| 4,220,276 | 9/1980 | Weisert et al. | 428/586 |
| 4,292,376 | 9/1981 | Hustler | 428/593 |
| 4,331,284 | 5/1982 | Schulz et al. | 228/157 |
| 4,361,262 | 11/1982 | Israeli | 428/586 |
| 4,434,930 | 3/1984 | Trenkler et al. | 228/118 |
| 4,577,797 | 3/1986 | Raymond | 228/118 |
| 4,820,355 | 4/1989 | Bampton | 428/586 |
| 5,118,026 | 6/1992 | Stacher | 228/157 |
| 5,139,887 | 8/1992 | Sutton | 428/586 |
| 5,205,467 | 4/1993 | Sarkisian et al. | 228/157 |

*Primary Examiner*—John Zimmerman
*Assistant Examiner*—N. M. Nguyen
*Attorney, Agent, or Firm*—Terrell P. Lewis; Charles T. Silberberg

[57] ABSTRACT

A stack of metallic sheets is constructed for selective diffusion bonding followed by superplastic forming to yield a metallic sandwich structure. The invention resides in the provision of gas distribution channels in the stack for assuring balanced and complete distribution of gas throughout the unbonded areas of the stack. The gas is used for expansion of the stack into a sandwich structure during the step of superplastic forming. The novel construction of each channel comprises superimposed grooves in opposed face sheets of the stack and slots in the core sheet(s) of the stack.

8 Claims, 2 Drawing Sheets

IMPROVED GAS MANIFOLDING FOR SUPER PLASTIC FORMING AND DIFFUSION BONDING OF TRUSS CORE SANDWICHES

This is a continuation of application Ser. No. 07/739,582, filed on Aug. 2, 1991, now abandoned.

BACKGROUND OF THE INVENTION

1. Field of the Invention

The present invention relates the fabrication of sandwich-type structural units from titanium materials, and more particularly to the provision of gas distribution channels in a layered stack of titanium alloy sheets, the channels enabling delivery of an expansion gas to the interior of the stack during superplastic formation of a sandwich structure.

2. Discussion of the Known Prior Art

In the family of titanium alloys, titanium aluminide materials have become well Known in the metallurgical arts as materials which exhibit excellent high-temperature strength and oxidation and creep resistance.

Titanium aluminides, like other titanium alloys, are metals which are relatively brittle and difficult to process and/or fabricate at or near room temperatures. One fabrication technique which has found widespread utility in the fashioning of structures for various industries is superplastic forming (SPF).

For many years, it has been Known that certain metals are "superplastic", i.e., have the capability of developing unusually high tensile elongations with reduced tendency toward necking. This property is exhibited by only a few metals and alloys and only within a limited temperature and strain rate range. Metals which appear to exhibit superplastic characteristics equal to or greater than those of any other metals are titanium, titanium alloys and, most recently, titanium aluminides. Indeed, with suitable titanium metals, it is possible to attain an overall increase in surface area of over 300%, and recent tests have shown these large elongations to be present in titanium aluminides as well.

The advantages of superplastic forming are numerous. Very complex shapes and deep drawn parts can be readily formed. Low deformation stresses are required to form the metal at the superplastic temperature range, thereby permitting forming of parts under low pressures which minimizes tool deformation and wear, allows the use of inexpensive tooling materials, and eliminates creep in the tool. Single male or female tools can be used; no spring-back occurs; no Bauschinger effect develops; multiple parts of different geometry can be made during a single operation; very small radii can be formed; and no problem with compression buckles or galling are encountered.

However, when carrying out the process of superplastic forming using titanium alloys, titanium aluminides and similar reactive metals, it is necessary to heat and form the materials in a controlled environment to ensure cleanliness of the titanium aluminide which is particularly sensitive to oxygen, nitrogen, and water vapor content in the air at elevated temperatures. Unless the titanium alloy material is protected, it becomes embrittled and its structural integrity is destroyed.

One solution to this problem has been to use pure argon gas as the uncontaminated environment in which to conduct superplastic forming of the titanium part. At the same time, the argon gas itself provides the mechanism for achieving the superplastic forming.

However, it has been found that with conventional forming apparatus, introduction and distribution of any gaseous medium for this purpose has been irregular and incomplete, thereby compromising the cleanliness of the forming environment and ultimately denigrating the structural integrity of the formed component.

SUMMARY OF THE INVENTION

It is therefore a primary object of the present invention to provide an improved gas distribution system within a stack of sheets of titanium alloy, or other similar reactive, materials for aiding the delivery of expansion gas during a superplastic sandwich-forming process and which will overcome all the deficiencies and drawbacks of known gas distribution systems.

Another object of the present invention is to provide a gas delivery system in a diffusion bonded stack of titanium alloy, and In particular titanium aluminide, sheets which facilitates a complete and even distribution of expansion gas throughout the unbonded areas of the stack so as to insure complete expansion of the unbonded portions of the stack sheets.

Still another object is to provide gas distribution channels in a stack of diffusion bonded sheets of titanium aluminide material, bonded prior to formation of a sandwich structure, where only when the stack of sheets has been properly assembled are the channels entirely embodied within the stack, and the channels consist of no other members or elements other than the sheets themselves.

Briefly, the invention resides in the provision of a plurality of channels formed in a stack of sheets of titanium alloy material, most preferably titanium aluminide material, which has been diffusion bonded at preselected areas in advance of effecting an expansion under superplastic conditions to form a sandwich structure.

More particularly, each channel in the stack consists of a region of material of each sheet in the stack configured to form a portion of the channel. Each respective sheet, upon being properly aligned during assembly of the stack, contributes to completion of the channel construction. The sheets are assembled to form the stack by superposing the sheets one atop another and aligning the sheets relative to one another vis-a-vis a predetermined reference system. The channels in the stack are formed solely by cooperation of the regions of material of the various superposed and aligned sheets themselves.

BRIEF DESCRIPTION OF THE DRAWINGS

Other objects and advantages of the invention will become apparent upon reading the following detailed description and upon reference to the drawings, in which.

While the invention will be described in connection with these preferred embodiments, it is to be understood that the following detailed description is not intended to limit the invention to those features described. On the contrary, all alternatives, modifications, and equivalents are covered which may be included within the spirit and scope of the invention.

DETAILED DESCRIPTION OF THE INVENTION

Referring to FIGS. 1–5 of the drawings, there is shown a preferred embodiment of the present invention. The invention as shown contemplates gas distribution channels which extend in the longitudinal direction of the stack. Alternatively, the gas distribution channels could extend through the stack in a direction transverse to the longitudinal axis of the stack.

Figure 1:
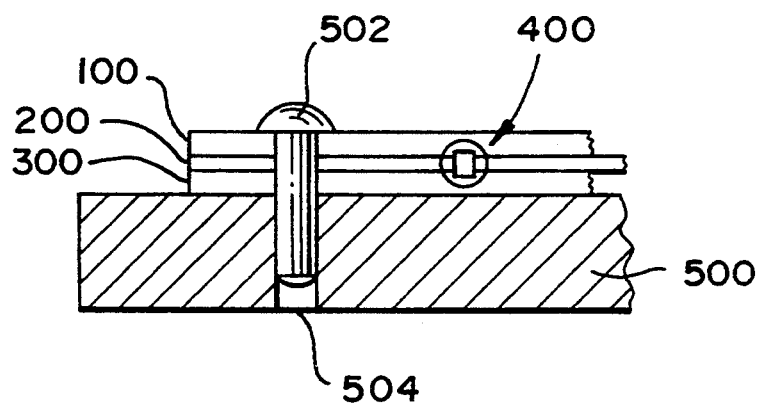
FIG. 1 is an end view of a three-piece metal sheet stack assembled such that gas distribution channels have been formed in the stack.
Figure 5:
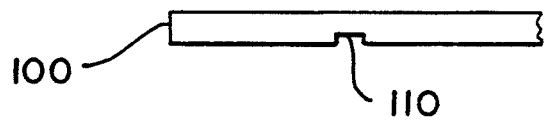
FIG. 5 depicts a cross sectional view through groove 110 formed in the top sheet 100, taken in the direction shown In FIG. 2.
Figure 2:
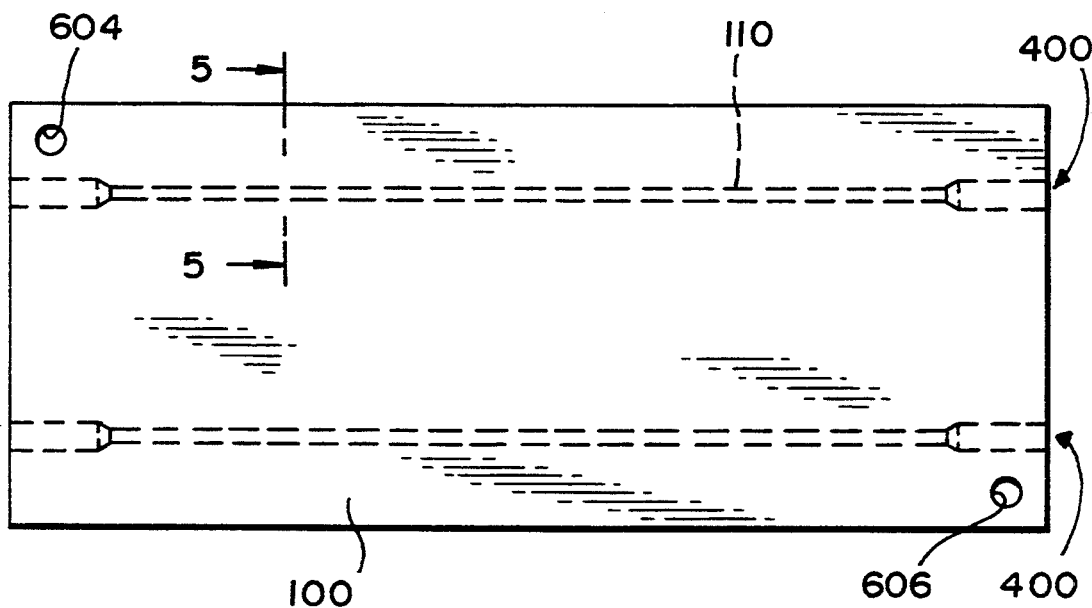
FIGS. 2, 3 and 4 are top views of each of the top, middle and bottom sheets, respectively, of the three piece metal sheet stack, showing a first orientation of the gas distribution channels formed in the stack illustrated in FIG. 1.

In FIG. 1, there is shown an end view of a multi-sheet stack of metallic material of the type contemplated by this invention. The stack depicted in the Figures of this application comprises a three-sheet stack, but it is contemplated that the teachings embodied in the following invention description could be applied to stacks comprising two, and four or more, sheets, as long as the resultant structure is of the sandwich type.

Figure 3:
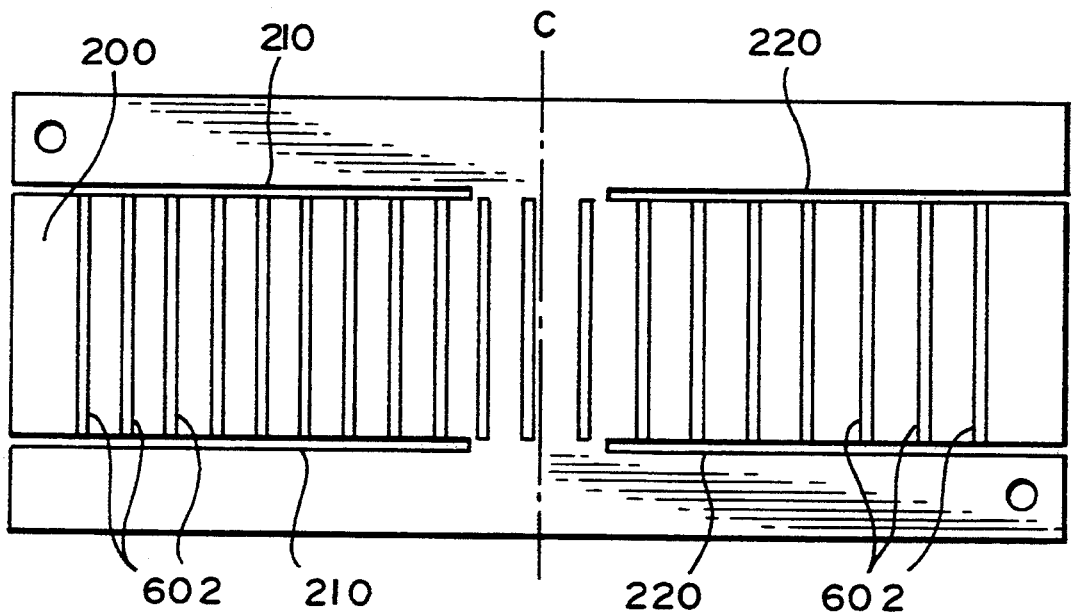
Figure 4:
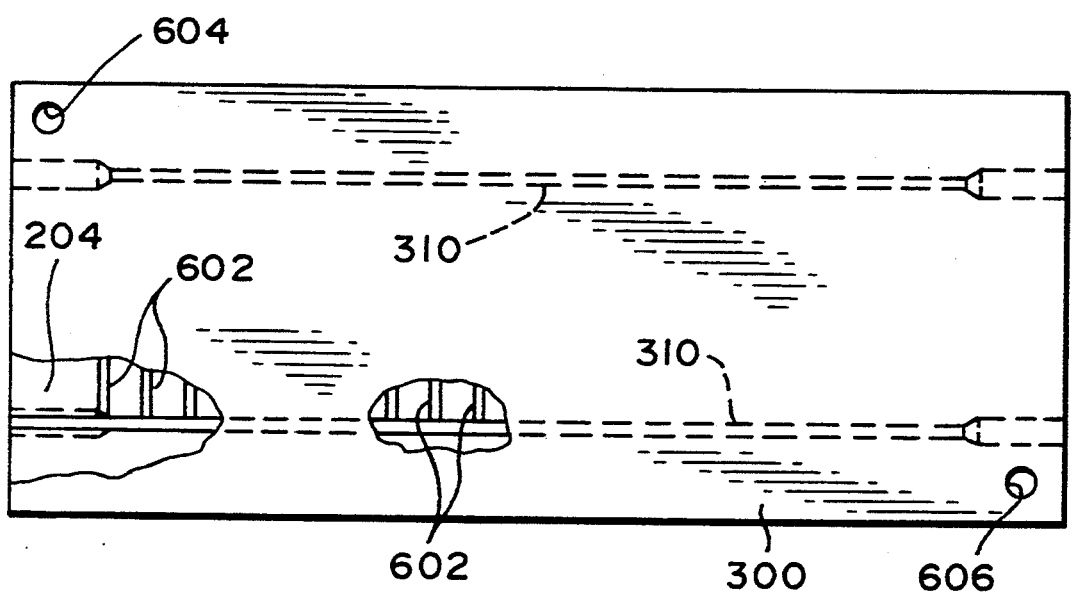

The stack illustrated is depicted after having already been joined or bonded at a variety of preselected regions, just prior to being expanded via a process of super-plastic forming into a sandwich structure. The attachment of the various regions of the sheets is necessary in order to insure formation of a sandwich structure when the stack is superplastically expanded. In order to join only selected areas of the metal sheets, a preferred step involves the application of a suitable stop-off material to those areas within the stack of sheets where no attachment or joining between the sheets is desired. FIGS. 3 and 4 show stop-off patterns 602 which have been applied to a surface 204 of the middle sheet 200. It is to be understood that the stop-off patterns extend only to, and inbetween, the slots defined in the middle sheet 200.

Attachment of the various preselected regions of the sheets may be achieved via a process of diffusion bonding; however the invention contemplates any other joining or bonding methods (e.g., brazing or spot welding) which will yield the desired attachments of facing metal sheets so that, when the bonded sheets of the stack are expanded under superplastic conditions, the desired sandwich structure will be produced. Ordinarily, the number of sheets used to form the stack will vary depending on load conditions and design requirements; however, a minimum of three sheets must be used, and depending on the number of sheets to be expanded, at least one of the sheets must exhibit superplastic properties. The initial thickness of metal sheets is determined as a function of the dimensions of the part to be formed.

In FIG. 1, the three sheets shown are disposed atop one another and all three sheets 100, 200 and 300 are maintained in this assembled state during various stages of treatment with the aid of the assembly tool 500, at least one assembly pin 502 and the alignment hole 504 provided in at least one location in the assembly tool. Typically, as noted above, each sheet of the stack includes at least one alignment aperture located in such a manner as to correspond with the alignment hole 504 of the alignment tool 500. Each sheet of the stack is provided with a pair of alignment apertures 604, 606 placed at spaced locations, which in the case of sheets 100, 200, 300 illustrated in the present drawings, are placed at each of diagonally opposed corners. When the sheets are assembled to form the stack, the alignment apertures of the individual but superposed sheets overlie one another forming a single aperture. The sheets are secured to the assembly tool 500 via the placement of the pin 502 through the single aperture of the stack and then through the alignment hole 504 in the alignment tool.

Each of the sheets, as well as the stack itself, possesses a longitudinal axis and a transverse axis. Both the top sheet 100 of the stack and the bottom sheet 300 of the stack are provided with grooves or voided regions 110 and 310 of square or rectangular cross-section which are typically cut or sawed into the sheet surface (note groove 110 in FIG. 5) and which extend in a direction parallel to the longitudinal axis of the stack. The middle sheet 200 is formed with pairs of slots 210, 220, each pair extending from a respective edge of the sheet toward the central region thereof, and in a direction parallel to the longitudinal axis of the stack. Each slot is provided with a width which approximates the width of the grooves carried in each of the top and the bottom sheets 100 and 300 of the stack. As shown in FIG. 3, the interior-most ends of each pair of the slots terminate short of the transverse center-line C of the sheet so that the central portion of the sheet is left intact.

It is to be noted that each sheet of the stack embodies only a portion of the respective channel involved and that each channel as a whole is formed only when all the sheets of the stack are correctly disposed one atop the other and secured together. It is also to be noted that each channel as a whole typically has a square or rectangular cross-section throughout substantially all of its length, with the exception of a small length of the channel adjacent the stack edges where the channels open (as discussed below).

Once the sheets have been assembled and secured, the channels formed by the superposed grooves and slots are such that they extend from one edge of the stack to the opposite edge. The portion of the channels at each opposite edge are reamed or drilled inwardly for a predetermined depth to form cylindrical openings 400 (see FIGS. 1 AND 2) of a size and depth to accomodate gas-forming needles used to expand the stack into the desired sandwich structure during the superplastic forming step of the forming process. The needles will be inserted in the openings 400 and secured therein by appropriate means in advance of heating the stack of sheets to the superplastic forming temperature. At that time, pressurized forming gas will be delivered to the interior of the stack of sheets via the channels as well as the volumes located between the stopped-off bands 602 to effect expansion of the sheets of the stack into a sandwich structure.

While the invention has been described in terms of grooves and slots extending in a longitudinal direction relative to the stack of sheets, it is also contemplated that the grooves and slots could be provided so as to extend in a direction transverse to the longitudinal direction of the stack. Indeed, with the exception of the change of direction of the grooves and slots, no other differences would need to be effected.

Thus it is apparent that there has been provided, in accordance with the invention, a method for forming gas-conveying channels in a stack of sheets of titanium alloy, or similar material, workpieces, as well as a novel channel-bearing stack which facilitates superplastic forming of the stack, which fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which fall within the spirit and scope of the appended claims.

What I claim as my invention is:

1. An improved gas delivery apparatus for assuring a complete and even distribution of super plastic forming expansion gas throughout a stack of three or more sheets of metal, the stack including two outer sheets and at least one inner sheet disposed between the outer sheets, and the region between the outer sheets defining an interior of said stack, said at least one inner sheet having stop off material deposited to partially cover at least one surface of said at least one inner sheet, said outer sheets and said at least one inner sheet being diffusion bonded where the stop-off material is not present to form said stack, said at least one inner sheet exhibiting superplastic properties, said stack delimiting a length, a width and a thickness, said gas delivery apparatus comprising:

channel means, extending across at least a portion of the width and substantially the entire length of said stack, for delivering said expansion gas from a source to the interior of said stack, said channel means being defined after assembly of the stack, and bonding of the sheets into said stack and comprising substantially linear voided regions in one face of each of the outer sheets of the stack and linear slots in each inner sheet of the stack, said voided regions and said slots cooperating to define said channel means, and further cooperating to communicate the interior of said stack with the source of super plastic forming expansion gas, after said sheets have been assembled and diffusion bonded to form said stack.

2. The gas delivery apparatus of claim 1, wherein said voided regions define, with said slots, a cylindrical portion connecting said gas source with the interior of said stack.

3. The gas delivery apparatus of claim 1, wherein said voided regions extend in a direction substantially parallel to an axis of said stack.

4. The gas delivery apparatus of claim 3, wherein said slots in each said inner sheet extend along said axis.

5. The gas delivery apparatus of claim 4, wherein said slots in said central sheet are discontinuous in the central region of said central sheet.

6. An article of manufacture, comprising:

a stack of at least three sheets of metal including outer sheets and at least one inner sheet disposed between the outer sheets and with the region between said outer sheets defining an interior of said stack, said at least one inner sheet exhibiting superplastic properties, and said at least one inner sheet having a portion of at least one surface being covered by a stop-off material, said outer sheets and said at least one inner sheet being diffusion bonded except for the portion being covered by a stop-off material to form said stack, each of said outer sheets having a surface facing the other outer sheet, said surface of each outer sheet including grooves extending in a first direction, said at least one inner sheet including a plurality of slots corresponding in alignment with said grooves, said grooves in said outer sheets overlying said slots in said at least one inner sheet and cooperating with said slots to define channels extending in said first direction, whereby said channels facilitate uniform delivery of expansion gas from a source to the interior of said stack to effect expansion of said at least one inner sheet exhibiting superplastic properties during a superplastic forming operation.

7. The article of manufacture as set forth in claim 6, wherein said grooves and said slots are substantially linear.

8. The article of manufacture as set forth in claim 6, wherein the length of said slots is less than the length of said grooves.

* * * * *